United States Patent
Immonen et al.

(10) Patent No.: US 7,207,060 B2
(45) Date of Patent: Apr. 17, 2007

(54) METHOD, SYSTEM AND COMPUTER PROGRAM PRODUCT FOR SECURE TICKETING IN A COMMUNICATIONS DEVICE

(75) Inventors: Olli Immonen, Helsinki (FI); Nadarajah Asokan, Espoo (FI); Panu S. Markkanen, Oulu (FI)

(73) Assignee: Nokia Corporation, Espoo (FI)

( * ) Notice: Subject to any disclaimer, the term of this patent is extended or adjusted under 35 U.S.C. 154(b) by 900 days.

(21) Appl. No.: 10/051,249

(22) Filed: Jan. 22, 2002

(65) Prior Publication Data

US 2003/0105954 A1 Jun. 5, 2003

Related U.S. Application Data

(63) Continuation-in-part of application No. 09/978,701, filed on Oct. 18, 2001.

(51) Int. Cl.
G06F 7/04 (2006.01)
G06F 7/58 (2006.01)
G06F 15/16 (2006.01)
H04L 9/00 (2006.01)

(52) U.S. Cl. .............................. 726/10; 726/9; 726/20; 713/173; 902/25

(58) Field of Classification Search ................ 713/156, 713/173; 705/65; 726/9, 10, 20; 902/25
See application file for complete search history.

(56) References Cited

U.S. PATENT DOCUMENTS

| 4,200,770 A | 4/1980 | Hellman et al. .............. 380/30 |
| 4,523,087 A | 6/1985 | Benton |
| 5,473,690 A * | 12/1995 | Grimonprez et al. ......... 705/66 |
| 5,544,246 A | 8/1996 | Mandelbaum et al. |
| 5,550,919 A * | 8/1996 | Kowalski ..................... 705/65 |
| 5,590,197 A | 12/1996 | Chen et al. |
| 5,604,787 A | 2/1997 | Kotzin et al. |
| 5,621,797 A | 4/1997 | Rosen |
| 5,623,637 A | 4/1997 | Jones et al. |
| 5,668,878 A | 9/1997 | Brands |
| 5,724,417 A | 3/1998 | Bartholomew et al. |
| 5,754,654 A * | 5/1998 | Hiroya et al. ................. 705/76 |
| 5,768,389 A | 6/1998 | Ishii |

(Continued)

FOREIGN PATENT DOCUMENTS

DE 19507044 9/1996

(Continued)

OTHER PUBLICATIONS

Electronic Frontiers Australia, Inc. (EFA). "Cryptography Terminology", 1997.*

(Continued)

*Primary Examiner*—Kambiz Zand
*Assistant Examiner*—Michael J. Simitoski
(74) *Attorney, Agent, or Firm*—Morgan & Finnegan, LLP (57) ABSTRACT

Method, system and computer program product for secure ticketing in a communications device. In particular, the method, system and computer program product utilizes cryptography and an external, read-write security element to securely transmit and store critical data utilized by users of a communications device. Using the present invention, third-parties can prevent the fraudulent use of third-party services without detection.

58 Claims, 6 Drawing Sheets

U.S. PATENT DOCUMENTS

| | | | |
|---|---|---|---|
| 5,781,723 A | 7/1998 | Yee et al. | |
| 5,841,865 A | 11/1998 | Sudia | 380/21 |
| 5,857,022 A | 1/1999 | Sudia | 380/30 |
| 6,009,150 A | 12/1999 | Kamel | |
| 6,009,177 A | 12/1999 | Sudia | 380/30 |
| 6,018,717 A | 1/2000 | Lee et al. | |
| 6,032,260 A | 2/2000 | Sasmazel et al. | |
| 6,038,551 A | 3/2000 | Barlow et al. | |
| 6,041,412 A | 3/2000 | Timson et al. | |
| 6,075,861 A | 6/2000 | Miller, II | |
| 6,085,976 A * | 7/2000 | Sehr | 235/384 |
| 6,148,404 A | 11/2000 | Yatsukawa | |
| 6,209,092 B1 * | 3/2001 | Linnartz | 713/176 |
| 6,311,171 B1 | 10/2001 | Dent | 705/64 |
| 6,331,972 B1 | 12/2001 | Harris et al. | |
| 6,351,813 B1 | 2/2002 | Mooney et al. | |
| 6,358,151 B1 | 3/2002 | Enzminger et al. | |
| 6,367,011 B1 | 4/2002 | Lee et al. | |
| 6,609,114 B1 * | 8/2003 | Gressel et al. | 705/50 |
| 6,690,794 B1 * | 2/2004 | Terao et al. | 380/22 |
| 6,704,872 B1 | 3/2004 | Okada | |
| 6,711,685 B1 * | 3/2004 | Schaal et al. | 726/31 |
| 6,779,112 B1 | 8/2004 | Guthery | |
| 6,816,707 B1 * | 11/2004 | Barker et al. | 455/41.2 |
| 6,842,741 B1 * | 1/2005 | Fujimura | 705/59 |
| 6,952,775 B1 * | 10/2005 | Miura | 713/182 |
| 2001/0049667 A1 | 12/2001 | Moribatake et al. | |
| 2002/0023208 A1 | 2/2002 | Jancula | |
| 2002/0034302 A1 | 3/2002 | Moriai et al. | |
| 2002/0094090 A1 * | 7/2002 | Iino | 380/282 |

FOREIGN PATENT DOCUMENTS

| | | |
|---|---|---|
| EP | 0730253 | 9/1996 |
| EP | 1 081 891 | 3/2001 |
| WO | WO 95/19672 | 7/1995 |
| WO | WO 00/28403 | 5/2000 |

OTHER PUBLICATIONS

Menezes, Alfred J. et al. "Handbook of Applied Cryptography", 1997 CRC Press, p. 39 & §8.1.*

Fujimura, et al. "General-purpose Digital Ticket Framework", 3rd USENIX Workshop on Electronic Commerce, Aug. 31-Sep. 3, 1998.*

Radek Vingralek, "GnatDb: A small-Footprint, Secure Database System", Abstract, downloaded print-out, www.star-lab.com.

William Shapiro et al., "How to Manager Persistent State in DRM System," Abstract, downloaded print-out, www.star-lab.com.

Diffie et al., "New Directions in Cryptography," IEEE Transactions on Information theory, Nov. 1976.

A. Conry-Murray, "Strategies & Issues: Public Key Infrastructure Nuts and Bolts", NetworkMagazine.com, www.networkmagazine.com.

International Search Report mailed on Feb. 13, 2003, for International Application No. PCT/IB02/04294.

International Search Report mailed on Feb. 14, 2003 in International application No. PCT/IB02/04288.

Antonio Maña et al., "GSM-Ticket: Generic Secure Mobile Ticketing Service", Gemplus Developer Conference, 'Online!, Jun. 21, 2001, pp. 1-7, XP002322564, Paris, France.

Masayuki Terada et al., "Copy Prevention Scheme For Rights Trading Infrastructure", Smart Card Research and Advanced Applications. IFIP TC8/WG8. 8 Fourth Working Conference on Smart Card Research and Advanced Applications, Kluwer Academic Publishers, Sep. 22, 2000, pp. 1-20, XP002952420, Bristol, UK.

Oorschot Menezes et al., "Handbook of Applied Crytography", CRC Press Series on Discrete Mathematics and Its Applications, 1997, pp. 354-355 and 397-405, XP002322565, Boca Raton, FL, US.

Supplementary European Search Report, dated Apr. 11, 2005.

"National Data Encryption Standard (DES) Algorithm", National Institute of Standards and Technology, Federal Register, Mar. 17, 1975, vol. 40, No. 52.

"National Data Encryption Standard (DES) Algorithm", National Institute of Standards and Technology, Federal Register, Aug. 1, 1975, vol. 40, No. 149.

* cited by examiner

METHOD, SYSTEM AND COMPUTER PROGRAM PRODUCT FOR SECURE TICKETING IN A COMMUNICATIONS DEVICE

CROSS-REFERENCE TO RELATED PATENT APPLICATION

This application is a continuation-in-part of application Ser. No. 09/978,701 titled, "A METHOD, SYSTEM AND COMPUTER PROGRAM PRODUCT FOR INTEGRITY-PROTECTED STORAGE IN A PERSONAL COMMUNICATION DEVICE" filed on Oct. 18, 2001, which is incorporated herein by reference.

FIELD OF THE INVENTION

This invention relates to a method, system and computer program product for copy protection. The invention further relates to copy protection for use in communication devices.

BACKGROUND OF THE INVENTION

The use of communication devices in every aspect of our daily lives has increased dramatically over recent years. With the proliferation of communication devices such as personal trusted devices, it has become more and more important to protect the critical data used by the device. One popular feature of personal trusted devices is the use of electronic vouchers or tickets. A user of a personal trusted device may receive and store electronic tickets in the memory of the device and use them as payment for services provided by a third-party. For example, electronic tickets can be used to pay for admission to public events, riding, public transportation, etc. The tickets are generally paid for in advance and credited to the user of the terminal by a trusted third-party, or they are charged from the user by the operator through phone billing. However, although the use of electronic ticketing provides increased flexibility for the average consumer, it raises new security issues for third-parties that issue the electronic tickets.

For example, the issuer of a ticket may want to prevent a user of a personal trusted device from modifying or duplicating an issued ticket to travel by public transportation. The right to travel on public transportation is delivered to a user as an electronic ticket that specifies a number of uses. However, if a user can some how modify or duplicate the ticket, the user may make an indefinite number of trips without having to pay the issuer of the ticket for each use.

Various methods of cryptography have been used to protect against undetectable modification or duplication of critical data. Cryptography involves the encoding or encrypting of digital data to render it incomprehensible by all but the intended recipients. In other words, the data is encrypted and the decryption key is delivered to those terminals or users that have paid to use the data. To this end, cryptographic systems can be used to preserve the privacy and integrity of the data by preventing the use and alteration of data by unauthorized parties. In addition to encryption, authentication of the origin of data is used in order to make sure that e.g., only a party who has the right key can generate the right signature of message authentication code (MAC).

For example, a plaintext message consisting of digitized sounds, letters and/or numbers can be encoded numerically and then encrypted using a complex mathematical algorithm that transforms the encoded message based on a given set of numbers or digits, also known as a cipher key. The cipher key is a sequence of data bits that may either be randomly chosen or have special mathematical properties, depending on the algorithm or cryptosystem used. Sophisticated cryptographic algorithms implemented on computers can transform and manipulate numbers that are hundreds or thousands of bits in length and can resist any known method of unauthorized decryption. There are two basic classes of cryptographic algorithms: symmetric key algorithms and asymmetric key algorithms.

Symmetric key algorithms use an identical cipher key for both encrypting by the sender of the communication and decrypting by the receiver of the communication. Symmetric key cryptosystems are built on the mutual trust of the two parties sharing the cipher key to use the cryptosystem to protect against distrusted third parties. A well-known symmetric key algorithm is the National Data Encryption Standard (DES) algorithm first published by the National Institute of Standards and Technology. See Federal Register, Mar. 17, 1975, Vol. 40, No. 52 and Aug. 1, 1975, Vol. 40, No. 149. The sending cryptographic device uses the DES algorithm to encrypt the message when loaded with the cipher key (a DES cipher key is 56 bits long) for that session of communication (the session key). The recipient cryptographic device uses an inverse of the DES algorithm to decrypt the encrypted message when loaded with the same cipher key as was used for encryption.

Asymmetric key algorithms use different cipher keys for encrypting and decrypting. In a cryptosystem using an asymmetric key algorithm, the user makes the encryption key public and keeps the decryption key private, and it is not feasible to derive the private decryption key from the public encryption key. Thus, anyone who knows the public key of a particular user could encrypt a message to that user, whereas only the user who is the owner of the private key corresponding to that public key could decrypt the message. This public/private key system was first proposed in Diffie and Hellman, "New Directions in Cryptography," IEEE Transactions on Information Theory, November 1976, and in U.S. Pat. No. 4,200,770 (Hellman et al.), both of which are hereby incorporated by reference. The most commonly used public key system for encryption and signing is RSA public key cryptography. RSA is a public key encryption algorithm that was invented in 1977 and named after its inventors Rivest, Shamir and Adleman. A more recent development in the area of cryptography is the digital signature. The digital signature is a mechanism that does not involve secrets but it protects data from undetected change by associating the data with the owner of a specific private key. Thus, a digital signature tends to be extremely difficult to forge.

While standard cryptographic methods can be used to implement most aspects of secure ticketing, protection against copying requires that the ticket collecting device retain state information about previously used tickets. However, in an off-line ticket collection scenario with many different collecting devices (e.g., one on each bus), there is no common trusted storage shared by all collecting devices.

Therefore, it is desirable to provide a system, method and computer program product that provides secured ticketing in a communications device, such as e.g., personal trusted device using a tamper-resistant security element. The system, method and computer program product of the embodiment of present invention disclosed herein address this need.

SUMMARY OF THE INVENTION

A method, system and computer program product for preventing duplication of critical data utilized by tickets, which are utilized with a communications device.

The method, system and computer program product of the embodiments of the present invention present invention use a tamper-resistant security element and cryptography for the secure transmission and storage of tickets used by communication devices.

It is contemplated by an embodiment of the invention that communication between a communications device, a tamper-resistant security element, and a third party device is achieved using at least two basic communication protocols: 1) request and store ticket protocol, and 2) use ticket protocol.

It is contemplated by an embodiment of the invention that communication between elements in the communication device and third-party devices also includes a check ticket protocol.

BRIEF DESCRIPTION OF THE DRAWINGS

The accompanying figures illustrate the details of the method, system and computer program product of an embodiment of the present invention for implementing secure ticketing in a communications device. Like reference numbers and designations in these figures refer to like elements.

DETAILED DESCRIPTION OF THE INVENTION

Figure 1:
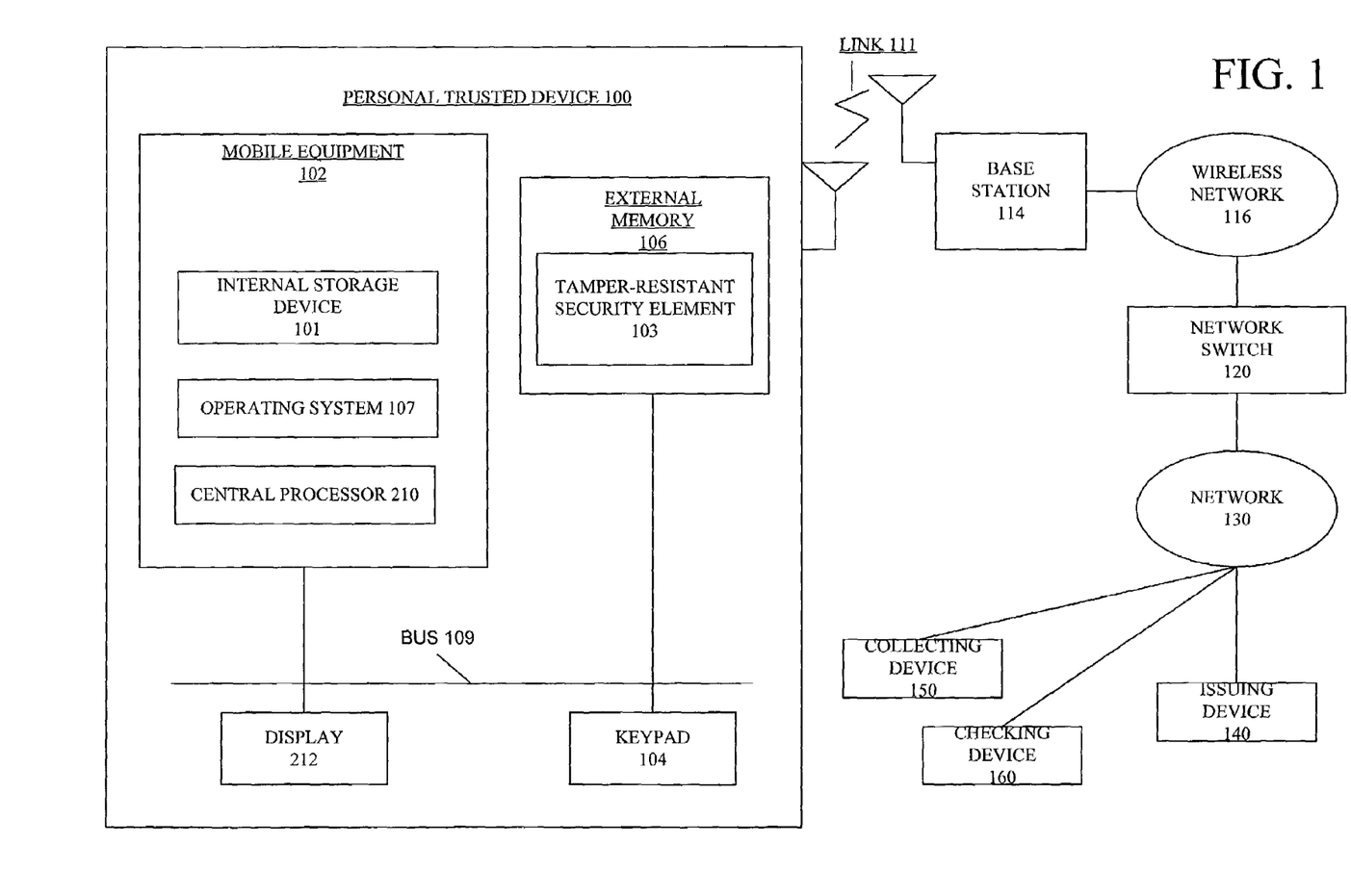
FIG. 1 is a network diagram that illustrates a communication device in accordance with an embodiment of the invention.

FIG. 1 is an embodiment of the present invention that illustrates a system for secured ticketing in a communications device. The personal trusted device 100 is a wireless handheld telephone, a satellite telephone, a personal digital assistant, or a bluetooth device or any other communications device. The personal trusted device (PTD) 100 includes a mobile equipment (ME) 102 and a secure element 106. The mobile equipment 102 includes an internal storage device 101, operating system 107 and central processor 210. The external memory 106 includes a tamper-resistant security element (SE) 103. Tamper-resistant is a term known in the art that defines a secure section or memory or storage. A tamper-resistant boundary makes it difficult for an attacker to get at an internal element or data within a secure section. An example of security element framework is an ISO/IEC 7816, identification card-integrated circuit(s) cards with contacts, and utilizing AID (application identifier) defined in ISO/IEC 7816—with added functionality according to the embodiment of the invention. Other examples include secure MMC (Multimedia Card), embedded hardware, etc. The security element 103 is an electronic card such as smartcard, flashcard or WIM card that is received by the personal trusted device 100 and completely removable.

The mobile equipment 102 is in communication with the security element 103 via the bus 109. Additionally, the personal trusted device 100 is in communication with third-party devices 140, 150, 160 for receiving and transmitting electronic tickets via a connection 111, which is typically, but not necessarily a wireless connection. Examples of the communication links may comprise e.g., GSM, GPRS, WCDMA, DECT, WLAN, PSTN, ISDN, ADSL and XDSL connections or the DOCSIS return channel in a cable TV environment, or any short range connection like Bluetooth, IrDA. Communication between the mobile equipment 102, external memory 106 and third-party devices 140, 150 and 160 is achieved using various protocols executed by the operating system 107 and the central processor 210. The protocols used for communication between the mobile equipment 102, the security element 103 and third-party devices 140, 150, 160 include, in an embodiment, a request and store ticket protocol, a use ticket protocol and a check ticket protocol.

The personal trusted device 100 in FIG. 1 is connectable to, for example, a wireless network 116 via a transmitted signal such as a frequency-modulated signal from the personal trusted device 100 and received by a base station antenna 114. It will be understood that the mobile equipment 102 may be provided also with the short range connectivity in addition to the mobile communication activity. From the wireless network 116, the personal trusted device can be connected to various third-party devices 140, 150, 160 via a network 130 and a wireless network switch 120. The network 130 can be a server, Intranet, Internet, public switching network (PSTN), public exchange (PBX) or the like. The user (not shown) of the device can communicate with the personal trusted device 100 using the display 212 and keypad 104 via the bus 109.

The third-party devices 140, 150, 160 are in an embodiment of the invention devices that are connected to computer servers, or to a computer network 130 or the like, which are owned or operated by a third-party and are used to process and monitor the use of third-party services by the user of the personal trusted device 100. By way of example, the third-party provides a service to the user of the personal trusted device 100 that may relate to payment for public transportation, admission to a public event, etc. The user of the personal trusted device 100 pays for the service in advance and is then credited with an electronic ticket by the issuing device 140 via the connection 111 and the remaining network illustrated in FIG. 1. Occasionally, it is necessary for the third party to check or verify the number of electronic tickets stored in the personal trusted device, which is done using a checking device 160. After receiving the electronic tickets, the user can use or redeem the tickets with the third party by sending the ticket to the collecting device 150.

The security element 103 and the ticket used for secure ticketing are further described herein using a simplified example. A secure element 103 comprises a plurality of counters, a certificate and a pair of cryptographic keys. Every counter comprises a unique counter identification, counter ID and a counter value. The counter is zero when the counter is created and initiated. The counter value represents the number of uses of a ticket and is incremented every time, when the associated ticket is used.

Security Element:
Certificate (issued by the manufacturer)
A Cryptographic Key Pair (public key, private key), e.g., RSA key pair.
Counters:

|  | Counter ID | Counter Value |
|---|---|---|
| [counter 1] | 12345 | 5 |
| [counter 2] | 12346 | 3 |
| [counter 3] | 12347 | 1 |
| [counter n] | 12349 | 0 |

In this example, the security element comprises n counters, each associated with an issued ticket. The ticket itself is stored in the mobile equipment in a first storage device. The counter 1 has a unique identification number "12345" and the value of the counter 1 is "5," which means that the associated ticket has been used for five (5) times. Correspondingly, the ticket associated with the counter ID "12346" has been used three (3) times. The public key for this security device in this example is "12abc." Each of the tickets issued by an issuing device and stored in the first storage device of mobile equipment can be described as follows:

|  | Counter ID | Public Key | N | Additional Information | Signature |
|---|---|---|---|---|---|
| [ticket 1] | 12345 | 12abc | 10 | Greyhound | 3458a |
| [ticket 2] | 12346 | 12abc | 10 | Suburban train | 25f72 |
| [ticket 3] | 12347 | 12abc | 3 | Cinema "stardust" | 807 |
| [ticket n] | 12349 | 12abc | 1 | State Filharmonic (seat 234; May 23, 2002) | b62gp |

Every ticket has a signature, which can be verified using the public key of the issuer of the ticket. Because all tickets in the example have been issued by different issuing devices they have different signatures and the signatures can be verified using the public key of the issuing device. When the ticket is presented to a collecting device, the collecting device checks the validity of the ticket by verifying the signature in the ticket. The first ticket is associated with the counter ID "12345" and it is issued by "Grey Hound Co." for ten (10) uses. Correspondingly, the ticket associated with the counter ID "12347" is issued by the cinema company "stardust" for three (3) uses. The additional information can specify the rights as in the example for the ticket issued by the "State Filharmonic" to a certain date and to a certain seat. If the "counter value" stored in the security element is compared with the value "N" in the ticket, it can be seen that the user having a ticket with a counter ID "12345" has used "Greyhound Co." services five (5) times and can still use the services of "Greyhound Co." for another five ( 5) times.

Figure 2:
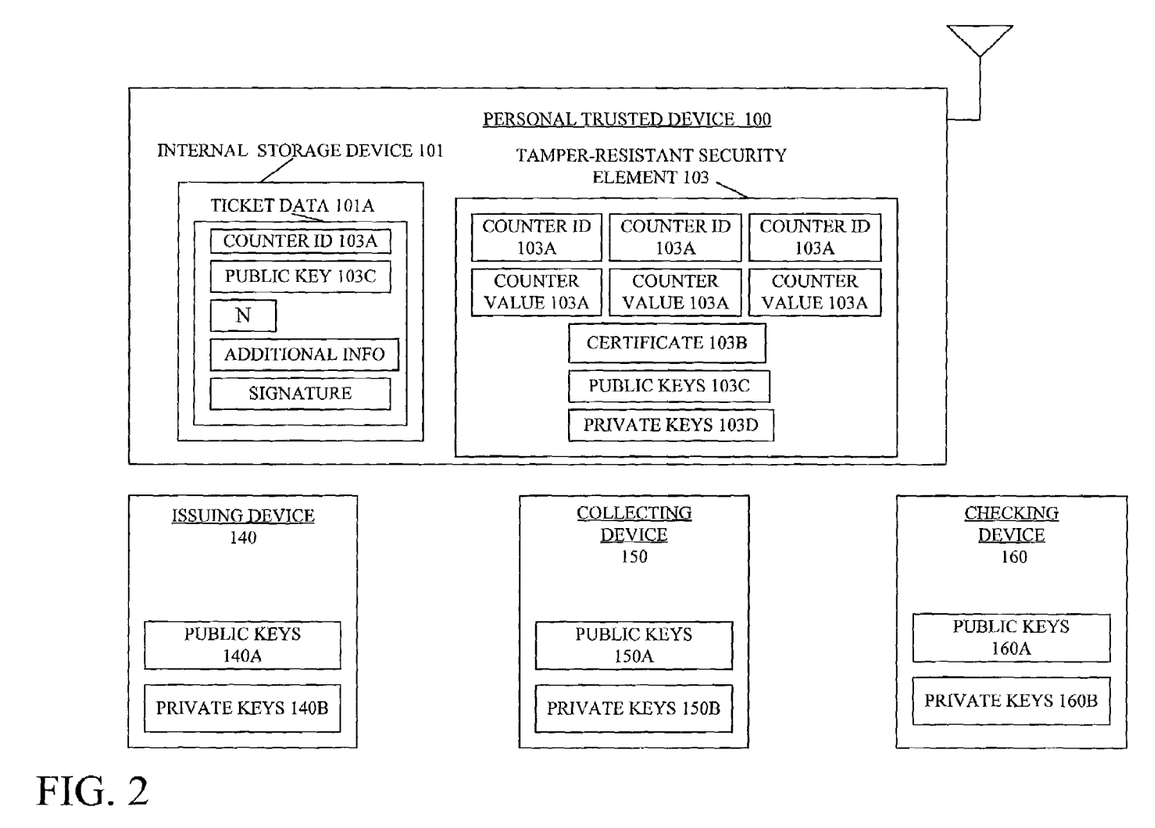
FIG. 2 is a network diagram that illustrates the use of cryptography in accordance with an embodiment of the present invention.

FIG. 2 illustrates in more detail the cryptography for implementing secured ticketing by mobile equipment 102, the security element 103, and third-party devices 140, 150, 160 in accordance with an embodiment of the invention. The mobile equipment 102 stores ticket data 101A in the internal storage device 101 of the personal trusted device 100. The ticket data 101 A corresponds to the valid tickets received from the issuing device 140 and not yet redeemed by the user. More importantly, the security element 103 is trusted by the third parties involved. The security element 103 uses the public key 103C and a corresponding private key 103D only to implement a trusted counter application. Additionally, the mobile equipment 102 may also request a manufacturer certificate 103B to ensure that the external securit device 103 is issued by a trusted manufacturer.

The security element 103 is used to store a plurality of monotonically increasing or decreasing counters. Each of the counters consists of a unique identifier counter ID 103A and an associated current value that represents uses of an electronic ticket, which are redeemable by a user of the personal trusted device 100. For example, each time an electronic ticket is redeemed the counter value is updated and stored in the security element 103 of the personal trusted device 100. As mentioned previously, the security element 103 includes public and private keys 103C, 103D and a card certificate 103B.

The third-party devices contemplated by the invention include issuing devices 140, collecting devices 150, and checking devices 160. The issuing device is used to send electronic tickets to the user of the personal trusted device 100 after the payment of third-party services. Additionally, the collecting device 150 is used to redeem electronic tickets and the checking device 160 is used to check if the user is in possession of a correctly redeemed ticket. Each of the third-party devices includes public and private keys 140A, 140B, 150A, 150B, 160A, 160B. It is presumed that the personal trusted device 100 is trusted by the user but is not trusted by the third-party devices. Thus, each of third-party devices can use public and private keys 140A, 140B, 150A, 150B, 160A, 160B to encrypt critical data for secure communication of electronic tickets with the personal trusted device 100. The keys 140A, 140B, 150A, 150B, 160A, 160B in the third-party devices can be encryption keys, signature keys or master keys. A master key is a common symmetric key shared by all issuing, collecting and checking devices 140, 150, 160.

Figure 3:
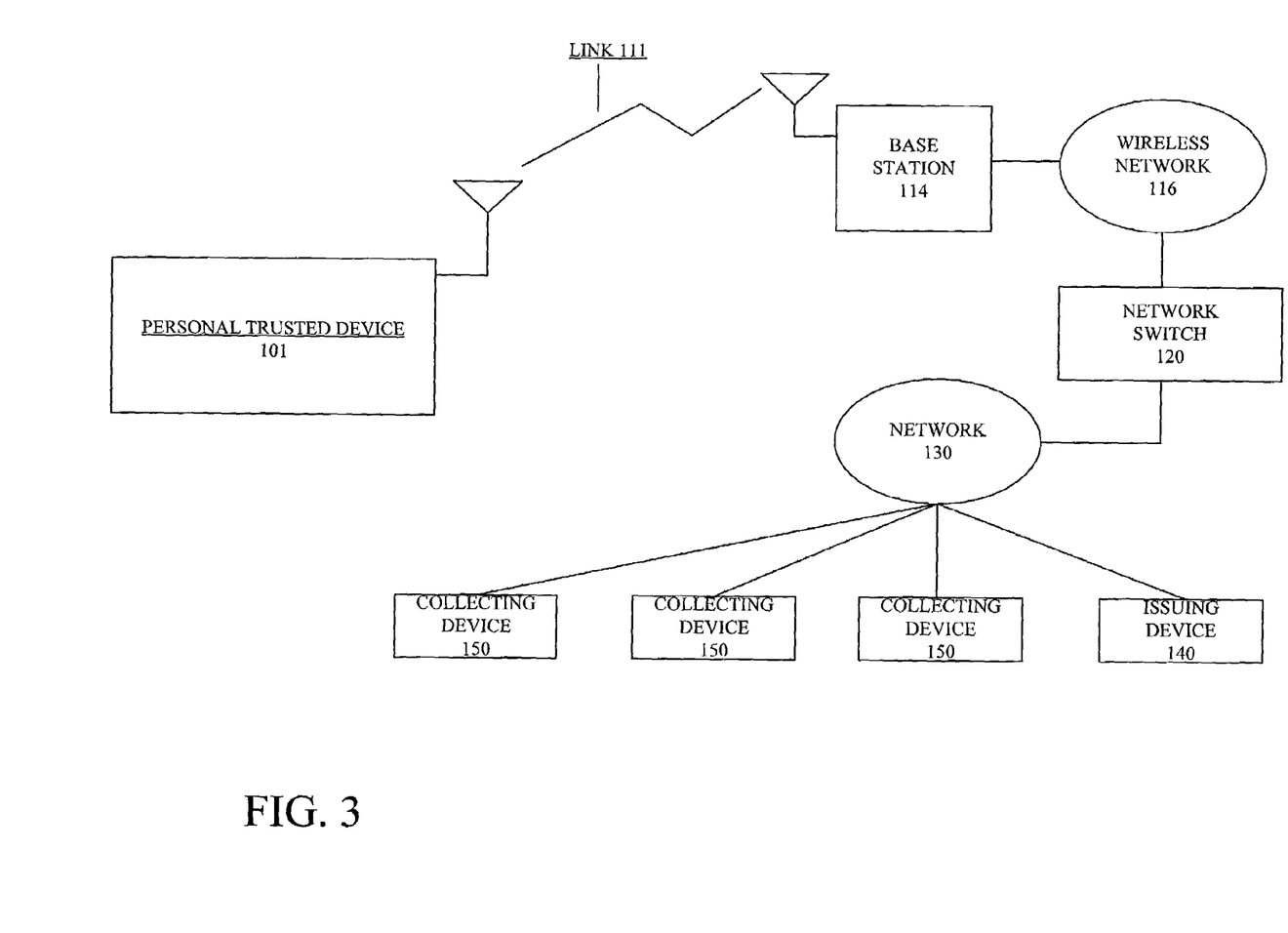
FIG. 3 is a detailed diagram that illustrates a communications device in accordance with an embodiment of the present invention.

FIG. 3 is another embodiment of the present invention that illustrates a system for secured ticketing in a personal trusted device 100. FIG. 3 differs from FIG. 1 in that the system includes a plurality of collection devices 150. A user of the personal trusted device 100 can redeem electronic tickets issued by issuing device 140 at any collection device 150 owned by a third-party. In other words, the user sends an electronic ticket to a collection device 150 via the connection 111 and the remaining network of FIG. 1. It is also contemplated by the invention that the system can also include more than one issuing device 140 or more than one checking device 160 (not shown).

Figure 4:
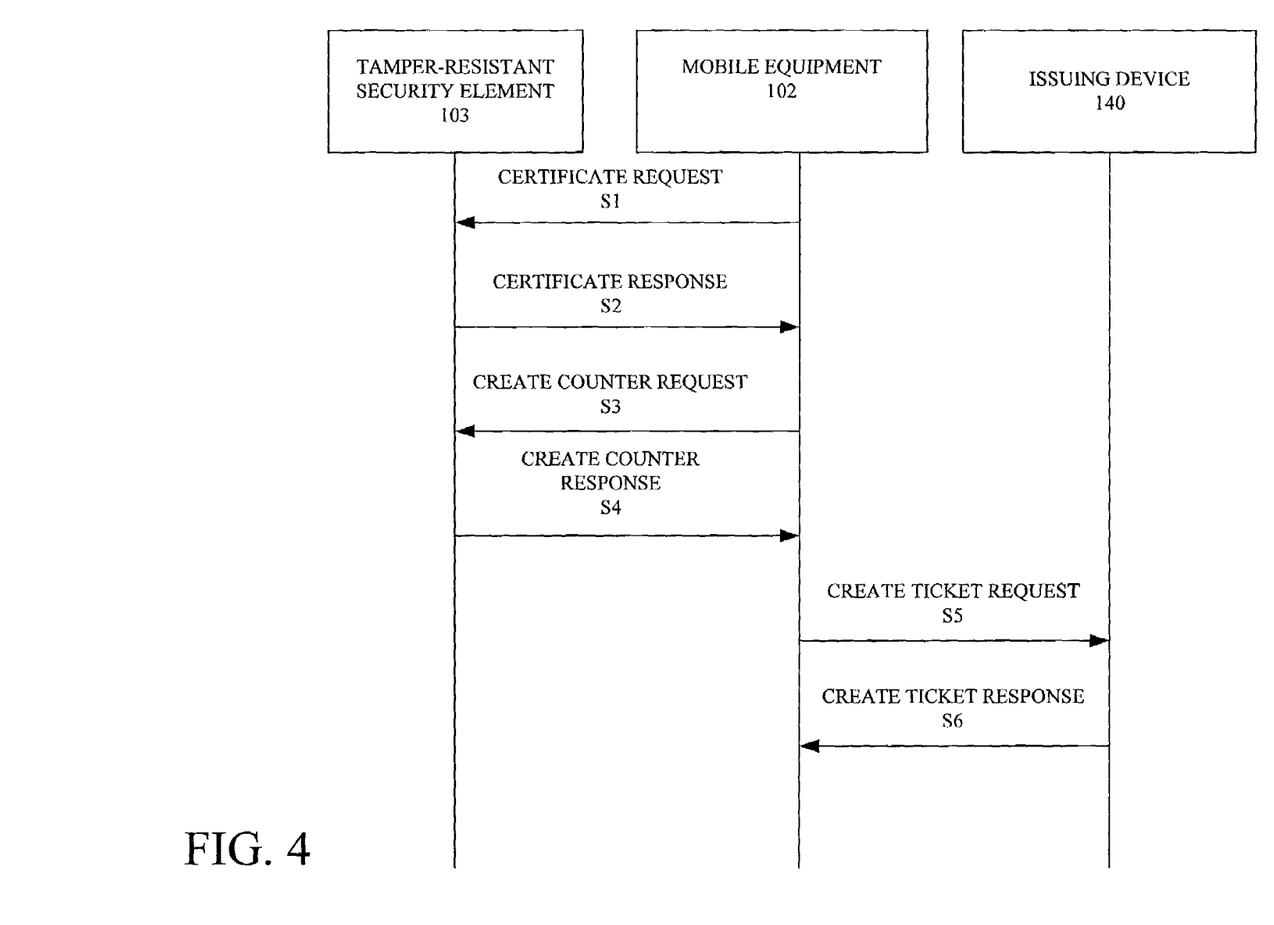
FIG. 4 is a flow diagram that illustrates the execution of the request and store ticket protocol in accordance with an embodiment of the invention.
Figure 5:
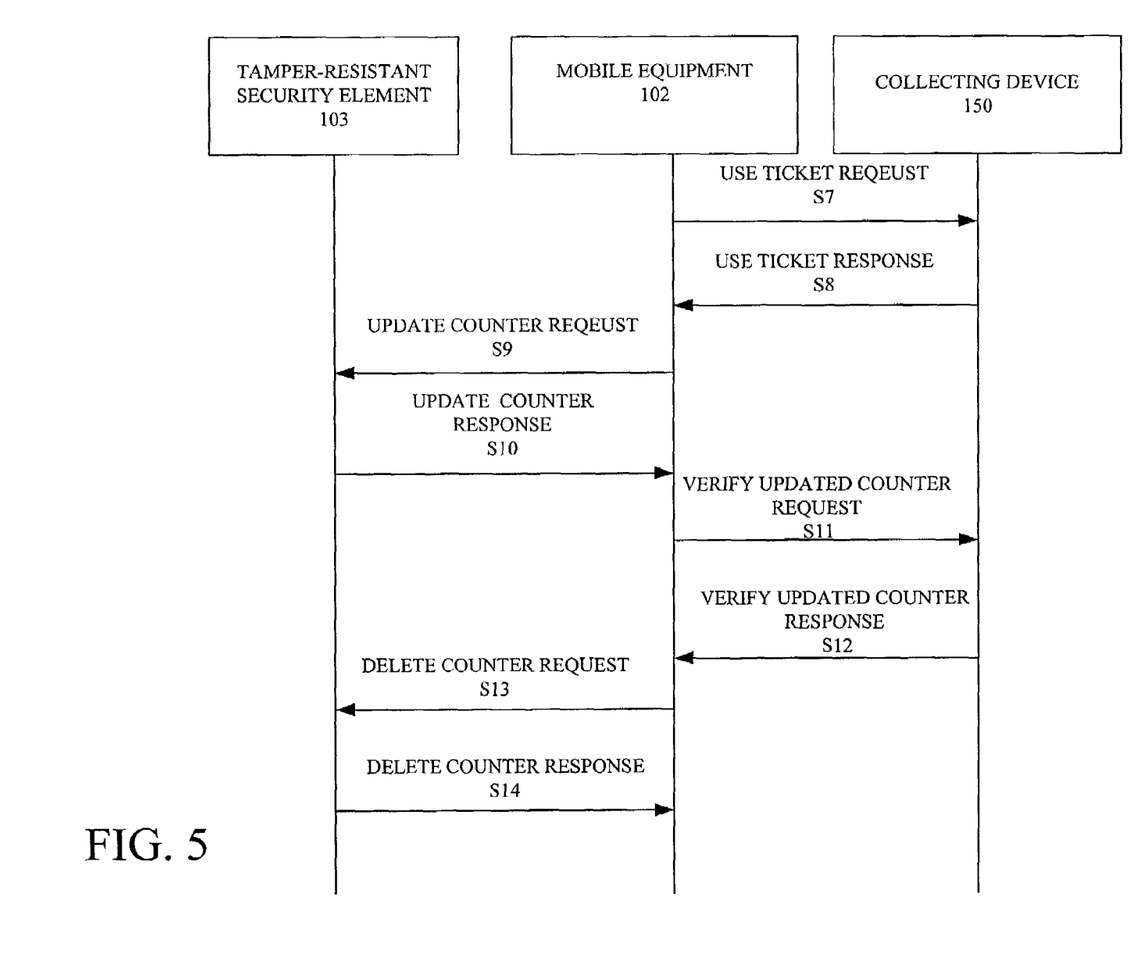
FIG. 5 is a flow diagram that illustrates the execution of a use ticket protocol in accordance with an embodiment of the invention.
Figure 6:
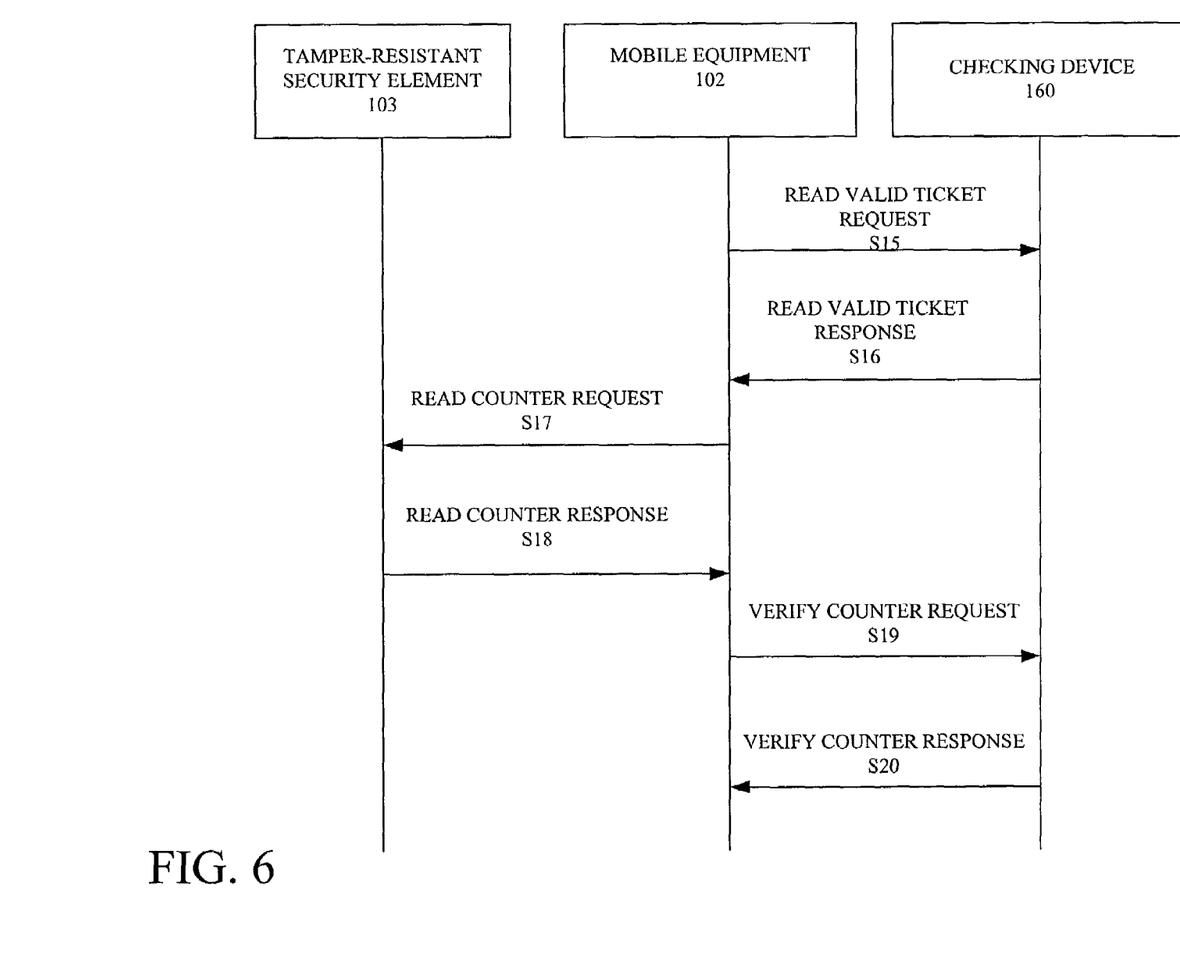
FIG. 6 is a flow diagram depicting the execution of a check ticket protocol in accordance with an embodiment of the invention.

FIGS. 4–6 illustrate an embodiment of the invention using protocols for secured ticketing in the personal trusted device 100 through communication between the mobile equipment 102, the security element 103 and third party devices 140, 150, 160.

FIG. 4 illustrates the steps involved for executing the request and store ticket protocol that is used for receiving and storing electronic tickets in the personal trusted device 100. Initially, in step S1 mobile equipment 102 requests the card certificate 103B stored in the security element 103. In anther embodiment of the invention the card certificate itself is not stored in the security element 103, but a pointer to the card certificate in the form of an URL address is stored in the security element 103, wherein in step S1 the mobile equipment 102 requests the card certificate from the URL. As mentioned previously, the certificate ensures that the security element 103 is issued by a trusted manufacturer. In step S2 the security element 103 sends a card certificate 103B, which is verified by the mobile equipment 102 as a compliant card using a certificate chain. Two certificates can be used in order for mobile equipment 102 to verify that the security element 103 possesses a compliant card certificate 103B. For example, a certificate issued by the mobile equipment 102 to the manufacturer of the security element 103, and a compliant card certificate issued by the manufacturer of the security element 103 to the security device 103 itself. In step S2, the security element 103 also sends a public key 103C or the card certificate 103B. In step S3, the mobile equipment 102 issues a create counter request to create a new counter to correspond to the electronic ticket that is to be received and later redeemed and/or checked by third party devices 140, 150, 160. In step S4, the security element 103 sends a counter ID that is used to uniquely identify a counter. In step S5, the mobile equipment 102 forwards the counter ID, and the public key and manufacturer certificate of the external security element 103 to the issuing device 140. In step S6, the issuing device 140 creates a ticket. The ticket is a signature on authenticator data for the issuing device consisting of the counter ID 103A, the public key 103C and a number of uses N (not shown) of the ticket created. The number of uses is, for example, the number of uses allowed by the user for this ticket (e.g., 10-use ticket will have N=10). In addition, the authenticator data may include other relevant information, such as e.g., a seat number and/or a date and/or time related to the ticket, to be used by the personal trusted device 100. By way of example, the ticket issued using the issue ticket protocol resembles ticket=Sig_Issuer(counterID/Public Key_Device 103/N/other_info). In step S6, the ticket is sent to the mobile equipment 102 and stored in the internal storage device 101.

If the issuing device 140 wants to further determine the authenticity of the security element 103, and the ticket data 101A, the issuing device 140 can issue a challenge to the mobile equipment 102 prior to creating the ticket. In this case, the mobile equipment 102 responds to the challenge by invoking a read counter request and returns a signature on authenticator data for the security element 103 that includes the current counter value. If the signature and data are verified as correct, then the issuing device 140 will create and issue a valid ticket.

FIG. 5 illustrates the use ticket protocol in accordance with an embodiment of the invention. In step S7, the mobile equipment 102 redeems a ticket by sending a ticket to a collecting device 150 using, for example, the network connections illustrated in FIG. 1. In step S8, the collecting device 150 responds by sending a challenge to the mobile equipment 102. In step S9, the mobile equipment 102 invokes an update counter for the counter ID corresponding to the ticket by sending a request to the security element 103 with the challenge sent by the collecting device 150 as an input parameter. As a result of the update request, the security element 103 updates the counter by incrementing or decrementing the counter value and generating an authorization token. The authorization token is a signature on authenticator data that contains in addition to other parameters, the counter ID, current value of the counter and public key 103C. By way of example, the authorization token using the use protocol resembles AuthToken=Sig_Device 103 (Update_Response/CounterID/Challenge/Current_Value).

In step S10, the security element 103 returns the authority token to the mobile equipment 102. In step S11, the mobile equipment 102 forwards the authorization token to the collecting device 150. The collecting device 150 verifies the signature on the authorization token using a public key 103C of the security element 103 and then checks the current counter value. The collecting device 150 checks the counter value to ensure that the counter value is less than or equal to N. In step S12, the collecting device 150 sends an acknowledgment of the counter value to the mobile equipment 102.

The collecting device 150 may optionally send a validated ticket containing the counter ID 103A, the public key 103C and the current counter value and any other additional information to the mobile equipment 102. The validated ticket would then be received by the mobile equipment 102 and stored in the internal storage device 101.

Once the ticket is fully used up (e.g., counter value=N), the mobile equipment 102 can delete the counter. In step S13, the mobile equipment 102 sends a request to delete the counter to the external security element 103. The mobile equipment 102 sends the request along with the counter ID 103A. In step S14, the security element 103 responds by returning the result of the delete counter request. For example, the response is either success or failure.

The ticket issued by an issuing device 140 can also include a multi-use ticket. In the case of a multi-used ticket, the mobile equipment 102 may send both the original ticket as well as the set of validated tickets obtained from the collecting device 150. The collecting device 150 would then use the additional information (i.e., validated tickets) to make decisions with regard to access control. Additionally, a collecting device 150 may also replace an old ticket or issue a new ticket. To this end, a collecting device 150 also acts as an issuing device 140.

FIG. 6 illustrates the check ticket protocol in accordance with an embodiment of the invention. In step S15, the mobile equipment 102 sends a ticket to the checking device 160. In step S16, the checking device 160 sends a challenge to the mobile equipment 102. In step S17, the mobile equipment 102 invokes a read counter for the corresponding counter ID by sending a read counter request to the security element 103 using the challenge of the checking device 160 as an input parameter. In step S18, the security element 103 sends an authorization token that contains the current value of the counter to the mobile equipment 102. By way of example, the authorization token sent using the check ticket protocol is AuthToken=Sig_Device 103 (Read_Response/CounterID/Challenge/current_value). In step S19, the mobile equipment 102 forwards the authorization token from the security element 103 to the checking device 160. The checking device 160 checks the current value of the counter using the public key 103C. In step S20, the checking device 160 sends an acknowledgment to the mobile equipment 102 indicating the status of the check. The status of the check by the checking device 160 is either success or failure.

In an alternative embodiment, in the use ticket protocol, step S7 may be combined with step S11, and similarly in the check ticket protocol, step S15 may be combined with step S19.

In another embodiment, the challenge value (such as in step S8 of the use ticket protocol, or step S16 of the check ticket protocol) may be a periodically changing broadcast challenge that is common to all the user devices running the protocol at a given time period.

In another embodiment of the present invention, the ticket issued is a signature on authenticator data that includes an encryption using a master key that can be used to transport a reference to the ticket and its MACKey from the issuing devices 140 to the collecting devices 150, and from collecting device 150 to checking device 160. All of the entities share the master key for secured communication of data.

In yet another embodiment, the ticket includes a set of encryptions, one for each collector 150. Each individual encryption may be a public key encryption or shared key encryption. The latter is considered desirable if the number of collectors is small (<10) because it results in smaller tickets.

In yet another embodiment, the collecting device 150 can contact an issuing device 140 via a secure channel and obtain a key. In this case, the key may be an index key to a key database of the issuing device. This is considered desirable in the case of multi-use tickets where the number of uses is very high. In this embodiment, each collecting device 150 needs to contact the issuing device 140 only once for a given ticket.

Additionally, as an alternative to computing an authorization token, a MAC can be used as an authentication method. For example, the MAC can be a code function such as HMAC-MD5 with the public key 103C as the key of the MAC function. By way of example, the issue ticket protocol would change as follows if a MAC function is used as an authentication method. In response to a ticket request, the issuing device 140 creates a ticket and also computes an encrypted key (EncKey) by encrypting the counter ID and MAC key (MACKey) using the public encryption key 103C for the security element 103. By way of example, the ticket issued using the issue protocol and the MAC is Ticket=Sig_Issuer (CounterID/Public Key_Device 103/N/Other_Info), EncKey=Enc_device 103(CounterID/MACKey). The mobile equipment 102 inputs the received encrypted key EncKey into security element 103. The security element 103 recovers the MACKey from the EncKey and sets the authentication method to MAC using MACkey. The security element 103 sends an acknowledgment to the mobile equipment 102. Other protocols would have similar changes as noted above if a MAC is used as an authentication method.

Although illustrative embodiments have been described herein in detail, it should be noted and understood that the descriptions and drawings have been provided for purposes of illustration only and that other variations both in form and detail can be added thereupon without departing from the spirit and scope of the invention. The terms and expressions have been used as terms of description and not terms of limitation. There is no limitation to use the terms or expressions to exclude any equivalents of features shown and described or portions thereof.

We claim:

1. A system for secure ticketing in a communications device, comprising:
   a mobile equipment that includes a first storage device;
   a security element that includes a second storage device;
   at least one third-party device; and
   a processor in communication with said first storage device, said second storage device and said third-party device configured to:
      authenticate said security element;
      create and initiate at least one counter stored in said second storage device in said secure element by sending a request from said mobile equipment to create a counter in the security element and creating said counter in said security element by giving a unique counter ID and initializing a value in the counter;
      receive at least one electronic ticket from said third-party device and storing said at least one electronic ticket in said first storage device;
      redeem said at least one electronic ticket stored in said first storage device with said at least one third-party device; and
      update a counter value for the counter in said second storage device to correspond to the redemption of said electronic ticket with said third-party device.

2. The system of claim 1, wherein said counter stored in said second storage device is a monotonically increasing counter comprising a unique identifier and an associated current value corresponding to each of the stored electronic tickets.

3. The system of claim 1, wherein said counter stored in said second storage device is a monotonically decreasing counter comprising a unique identifier and an associated current value corresponding to each of the stored electronic tickets.

4. The system of claim 1, wherein said at least one electronic ticket sent by said at least one third-party device includes the counter value for the counter in said second storage device.

5. The system of claim 4, wherein the counter value is determined by the third-party device to correspond to a number of uses of a service provided by a third-party.

6. The system of claim 1, wherein said first storage device is an internal memory device in said communications device.

7. The system of claim 1, wherein said second storage device is a tamper-resistant memory device removably received by said communications device.

8. The system of claim 7, wherein said second storage device is an electronic card that is received by the communications device.

9. The system of claim 1 wherein said processor is a central processor in said communications device.

10. The system of claim 1, wherein the communication between said mobile equipment, security element and third-party device comprises the execution of a plurality of protocols using an operating system of the communications device.

11. The system of claim 10, wherein said plurality of protocols comprise a request and store ticket protocol, use ticket protocol, and check ticket protocol.

12. The system of claim 1, wherein said second storage device further comprises a manufacturer's certificate and a signature key pair.

13. The system of claim 1, wherein said second storage device further comprises an encryption key pair.

14. The system of claim 1, wherein said at least one third-party device further comprises an encryption key pair and a signature key pair.

15. The system of claim 1, wherein said at least one third-party device comprises at a ticket issuing device, a ticket collecting device and a checking device.

16. The system of claim 1, wherein said at least one third-party comprises a plurality of ticket collecting devices.

17. The system of claim 1, wherein the communications device comprises a cellular telephone, a satellite telephone, a personal digital assistant, a personal trusted device or a bluetooth device.

18. A method of secure ticketing in a communications device, comprising:
   authenticating a security element;
   creating and initiating at least one counter in said security element by sending a request from mobile equipment to create a counter in the security element and creating said counter in said security element by giving a unique counter ID and initializing a value in the counter;

requesting at least one electronic ticket from at least one third-party device;

storing said at least one electronic ticket received from said at least one third-party storage device in a storage device of said communications device;

redeeming said at least one electronic ticket stored in said storage device with said at least one third-party device; and updating said counter value in said counter in said security element to correspond to the redemption of said electronic ticket with at least one third-party device.

19. The method of claim 18, wherein said electronic ticket sent by said at least one third-party device includes the counter value for the counter in said security element.

20. The method of claims 19, wherein the counter value is determined by said at least one third-party device to correspond to a number of uses of a service provided by a third-party.

21. The method of claim 18, wherein said storage device is an internal memory device in the communications device.

22. The method of claim 18, wherein said security element comprises a tamper-resistant, read-write memory device removably received by said communications device.

23. The method of claim 18, further comprising storing a public key of said secured element in at least one third-party device.

24. The method of claim 18, further comprising storing a master key in said at least one third-party device.

25. The method of claim 18, wherein the communications device is a cellular telephone, a satellite telephone, a personal digital assistant, a personal trusted device or a bluetooth device.

26. The method of claim 18, wherein said at least one third-party comprises at a ticket issuing device, a ticket collecting device and a checking device.

27. A computer program product for secured ticketing in a communications device, comprising:

a computer readable medium;

program code in said computer readable medium for authenticating a security element;

program code in said computer readable medium for creating and initiating at least one counter in said security element by sending a request from mobile equipment to create a counter in the security element and creating said counter in said security element by giving a unique counter ID and initializing a value in the counter;

program code in said computer readable medium for requesting at least one electronic ticket from at least one third-party device;

program code in said computer-readable medium for storing said electronic ticket from said at least one third-party device in a storage device of said communications device;

program code in said computer-readable medium for redeeming said at least one electronic ticket stored in said storage device with at least one third-party device; and program code in said computer-readable medium for updating said counter value in said counter in said security element to correspond to redemption of said at least one electronic ticket with at least one third-party device.

28. A method of requesting, creating, and storing a ticket for secure ticketing in a system comprising a mobile equipment having a first storage device, a secure element having a security element comprising a second storage device with a certificate and a pair of encryption keys, and at least one third-party device having a cryptographic master public key and configured to issue tickets, the method comprising:

authenticating the said security element;

creating and initiating at least one counter in said security element by sending a request from said mobile equipment to create a counter in the security element and creating a said counter in said security element by giving a unique counter ID and initializing a value in the counter;

requesting at least one ticket from said third-party device;

creating at least one ticket by the said third-party device;

receiving at least one ticket from the said third-party device, and storing the said at least one ticket received in the first storage device.

29. The method of claim 28, wherein said authenticating the security element comprises:

said mobile equipment sending a request to the security element for a certificate of authenticity;

said security element sending as a response the requested certificate;

said mobile equipment receiving said requested certificate; and said mobile equipment verifying the compliance of the received requested certificate.

30. The method of claim 28, wherein said creating and initiating at least one counter comprises:

said mobile equipment sending a request to create a counter in the security element;

said security element creating a counter by giving a unique counter ID, and initializing the counter to zero; and said security element sending the created counter ID to said mobile equipment.

31. The method of claim 28, wherein receiving at least one ticket comprises:

said mobile equipment receiving at least one ticket created by the said third-party device, the ticket being a signature on authenticator data consisting of a received counter ID, a third party public key, a number representing the number of allowed uses for the ticket, and additional information; and said mobile equipment receiving an encryption key created by the said third-party device by encrypting with the public key of the security element the received counter ID and the associated message authentication key.

32. A method of claim 28, wherein said storing at least one ticket comprises:

said mobile equipment storing in the said first storage device the received at least one ticket created by the said third-party device, the ticket being a signature on authenticator data consisting of a received counter ID, a third party public key, a number representing the number of allowed uses for the ticket, and additional information;

said mobile equipment forwarding to the said security element a received encryption key created by the said third-party device by encrypting with the public key of the security element the received counter ID and a message authentication key generated by the third-party device and associated with.the counter ID;

said security element recovering the message authentication key from the received encryption key;

said security element storing the message authentication key and associating it with the counter ID; and said security element sending an acknowledgement to the mobile equipment.

33. A method of requesting, creating, and storing a ticket for secure ticketing in a system comprising a mobile equipment having a first storage device, a secure element having a security element comprising a second storage device with a certificate and a pair of encryption keys, and at least one third-party device having a cryptographic master public key and configured to issue tickets, the method comprising:
   authenticating the said security element;
   creating and initiating at least one counter in said security element;
   requesting at least one ticket from said third-party device;
   creating at least one ticket by the said third-party device;
   receiving at least one ticket from the said third-party device, and
   storing the said at least one ticket received in the first storage device;
   said mobile equipment sending to the said third-party device:
   a newly created counter ID received from the said security element;
   a certificate of the security element; and
   a public key of the security element.

34. A method of requesting, creating, and storing a ticket for secure ticketing in a system comprising a mobile equipment having a first storage device, a secure element having a security element comprising a second storage device with a certificate and a pair of encryption keys, and at least one third-party device having a cryptographic master public key and configured to issue tickets, the method comprising:
   authenticating the said security element;
   creating and initiating at least one counter in said security element;
   requesting at least one ticket from said third-party device;
   creating at least one ticket by the said third-party device;
   receiving at least one ticket from the said third-party device;
   storing the said at least one ticket received in the first storage device;
   the third party device receiving from the mobile equipment a counter ID, a certificate of the security element, and a public key of the security element;
   the third party device creating at least one ticket by forming a signature on authenticator data consisting of the received counter ID, said public key of the third party device, a number representing the number of allowed uses for the ticket, and additional information;
   the third party device generating a message authentication key associated with the received counter ID; and
   the third party device creating an encryption key by encrypting with the said public key of the security element the received counter ID and the generated message authentication key.

35. A method of using a ticket in a system for secure ticketing comprising
   a mobile equipment having a first storage device with a ticket stored therein, a secure element having a security element comprising a second storage device having a certificate, a pair of encryption keys, and at least one counter related to the stored ticket, the counter having an unique counter ID, a counter value, and a message authentication key, and at least one third-party device having a cryptographic master public key, the third-party configured to redeem tickets, the ticket being a signature on authenticator data consisting of a counter ID, said public key of the third-party, a number representing the number of allowed uses for the ticket, and additional information, the method comprising:
   said mobile equipment sending the stored ticket to the said third-party device for redeeming;
   said third-party device checking the validity of the received ticket;
   said third party sending a challenge to the said mobile equipment, if the ticket is deemed valid;
   said mobile equipment invoking counter update in said security element for the counter related to the ticket to be redeemed by sending the corresponding counter ID and said received challenge;
   said security element updating the said counter with a value specified by the third-party device;
   said security element generating an authorization token being a message authentication code computed by using the message authentication key stored in the counter;
   said security element sending the generated authorization token to the said mobile equipment;
   said mobile equipment forwarding the received authorization token to the said third-party device;
   said third-party device verifying the received authorization token by using the key in the received ticket; and
   said third-party device checking the current value of counter against the number of allowed uses in the ticket and sending a message to the mobile equipment corresponding the result of the check.

36. A method of claim 35, wherein the checking of the validity of the received ticket comprises verification of the signature on the ticket.

37. A method of claim 35, wherein the checking of the validity of the received ticket further comprises validity check of the additional information in the ticket.

38. A method of claim 35, wherein the message corresponding to the result of the check for counter value is a validated ticket being a signature on authenticator data consisting of the said counter ID, said public key, and said current counter value all taken from the received authorization token, and additional information.

39. A method of claim 35, further comprising storing the received validated ticket in the first storage device.

40. A method of claim 35, further comprising:
   said mobile equipment receiving a message as a result of the of the check for counter value showing that the ticket is fully used;
   said mobile equipment sending a request to the said security element to delete the said counter; and
   said security element returning the result of the delete counter request as a response.

41. A method of claim 35, wherein the ticket is a multi-use ticket, the method comprising:
   sending the stored ticket to the third-party device with sending also the stored validated tickets to the third-party device and using the additional information in the validated tickets for access control.

42. A method of checking a ticket in a system for secure ticketing comprising
   a mobile equipment having a first storage device with a ticket stored therein, a secure element having a security element comprising a second storage device having a certificate, a pair of encryption keys, and at least one counter related to the stored ticket, the counter having an unique counter ID, a counter value, and a message authentication key, and at least one third-party device having a cryptographic master public key, the third-party configured to check tickets, the ticket being a signature on authenticator data consisting of a counter ID, a public key of the third-party, a number representing the number of allowed uses for the ticket, and additional information, the method comprising:

said mobile equipment sending the stored ticket to the said third-party device for checking;

said third-party device checking the validity of the received ticket;

said third-party sending a challenge to the said mobile equipment;

said mobile equipment invoking a read counter in said security element for the counter related to the ticket to be checked by sending the corresponding counter ID and said received challenge;

said security element generating an authorization token being a message authentication code computed by using the message authentication key stored in the counter;

said security element sending the generated authorization token to the said mobile equipment;

said mobile equipment forwarding the received authorization token to the said third-party device; and said third-party device verifying the received authorization token by using the key in the received ticket and sending a message to the said mobile device indicating the result of the verification.

43. A security construction for a ticket system comprising:
an equipment having a first storage device,
a secure element linked to the first storage device, a security element comprising a second storage device having a pair of encryption keys and a certificate, and at least one counter in said security element comprising a unique counter ID and a counter value;
said counter created by sending a request from said equipment to create said counter in the security element and creating said counter in said security element by giving a unique counter ID and initializing a value in the counter;
at least one ticket stored at least partly in the first storage device having information about one of the encryption keys of the security element, counter ID; and
allowed use information operationally communicated with the security element to update said counter value in the respective counter identified by the counter ID in the security element.

44. A method of requesting, creating, and storing a ticket for secure ticketing in a system comprising a mobile equipment having a first storage device, a secure element having a security element comprising a second storage device having a certificate and a pair of encryption keys, and at least one third-party device configured to issue tickets, the method comprising:
authenticating the said security element;
creating at least one counter in said security element by sending a request from said mobile equipment to create said counter in the security element and creating said counter in said security element by giving a unique counter ID and initializing a value in the counter;
requesting at least one ticket from said third-party device;
creating at least one ticket by the said third-party device;
receiving at least one ticket from the said third-party device, and
storing the said at least one ticket received in the first storage device.

45. A method of claim 44, wherein said authenticating the security element comprises the steps of:
said mobile equipment sending a request to the security element for a certificate of authenticity;
said security element sending as a response the certificate;
said mobile equipment receiving said certificate; and
said mobile equipment verifying the compliance of the received certificate.

46. A method of claim 44, wherein creating at least one counter comprises:
said mobile equipment sending a request to create said counter in the security element;
said security element creating a said counter by giving a unique counter ID and initializing the counter to zero; and
said security element sending the created counter ID to said mobile equipment.

47. A method of claim 44, wherein receiving at least one ticket comprises
said mobile equipment receiving at least one ticket created by the said third-party device, the ticket being a signature on authenticator data consisting of a received counter ID, a received public key, a number representing the number of allowed uses for the ticket, and additional information.

48. A method of claim 44, wherein said storing at least one ticket comprises:
storing in the said first storage device the received at least one ticket created by the said third-party device, the ticket being a signature on authenticator data consisting of a received counter ID, a received public key, a number representing the number of allowed uses for the ticket, and additional information.

49. A method of requesting, creating, and storing a ticket for secure ticketing in a system comprising a mobile equipment having a first storage device, a secure element having a security element comprising a second storage device having a certificate and a pair of encryption keys, and at least one third-party device configured to issue tickets, the method comprising:
authenticating the said security element;
creating at least one counter in said security element;
requesting at least one ticket from said third-party device;
creating at least one ticket by the said third-party device;
receiving at least one ticket from the said third-party device; and
storing the said at least one ticket received in the first storage device;
said mobile equipment sending to the said third-party device, a newly created counter ID received from the said security element, a certificate of the security element, and a public key of the security element.

50. A method of requesting, creating, and storing a ticket for secure ticketing in a system comprising a mobile equipment having a first storage device, a secure element having a security element comprising a second storage device having a certificate and a pair of encryption keys, and at least one third-party device configured to issue tickets, the method comprising:
authenticating the said security element;
creating at least one counter in said security element;
requesting at least one ticket from said third-party device;
creating at least one ticket by the said third-party device;
receiving at least one ticket from the said third-party device;
storing the said at least one ticket received in the first storage device;

wherein said creating at least one ticket by the third-party comprises:
  receiving from the mobile equipment a counter ID, a certificate of the security element and a public key of the security element; and
  creating at least one ticket by forming a signature on authenticator data consisting of the received counter ID, received public key, a number representing the number of allowed uses for the ticket, and additional information.

51. A method of using a ticket in a system for secure ticketing comprising a mobile equipment having a first storage device with a ticket stored therein, a secure element having a security element comprising a second storage device having a certificate, a pair of encryption keys, and at least one counter related to the stored ticket; and at least one third-party device configured to redeem tickets, the ticket being a signature on authenticator data consisting of a counter ID, a public key of the secure element, a number representing the number of allowed uses for the ticket, and additional information, the method comprising:
  said mobile equipment sending the stored ticket to the said third-party device for redeeming;
  said third-party device checking the validity of the received ticket;
  said third party sending a challenge to the said mobile equipment, if the ticket is deemed valid;
  said mobile equipment invoking counter update in said security element for the counter related to the ticket to be redeemed by sending the corresponding counter ID and said received challenge;
  said security clement updating the said counter with a value specified by the third-party device;
  said security element generating an authorization token being a signature on authenticator data comprising the said counter ID, current value of the counter, and the public key of the security element;
  said security element sending the generated authorization token to the said mobile equipment;
  said mobile equipment forwarding the received authorization token to the said third-party device;
  said third-party device verifying the received authorization token by using the key in the received ticket; and
  said third-party device checking the current value of the counter against the number of allowed uses in the ticket and sending a message to the mobile equipment corresponding the result of the check.

52. A method of claim 51, wherein the checking of the validity of the received ticket comprises verification of the signature on the ticket.

53. A method of claim 51, wherein the checking of the validity of the received ticket further comprises validity check of the additional information in the ticket.

54. A method of claim 51, wherein the message corresponding to the result of the check for counter value is a validated ticket being a signature on authenticator data consisting the said counter ID, said public key, and said current counter value all taken from the received authorization token, and additional information.

55. A method of claim 51, further comprising storing the received validated ticket in the first storage device.

56. A method of claim 51, further comprising:
  said mobile equipment receiving a message as a result of the check for counter value showing that the ticket is fully used;
  said mobile equipment sending a request to the said security element to delete the said counter; and
  said security element returning the result of the delete counter request as a response.

57. A method of claim 51, wherein the ticket is a multi-use ticket, and the method comprising:
  sending the stored ticket to the third-party device with sending also the stored validated tickets to the third-party device and using the additional information in the validated tickets for access control.

58. A method of checking a ticket in a system for secure ticketing comprising
  a mobile equipment having a first storage device with a ticket stored therein, a secure element having a security element comprising a second storage device having a certificate, a pair of encryption keys, and at least one counter related to the stored ticket; and at least one third-party device configured to check tickets, the ticket being a signature on authenticator data consisting of a counter ID, a public key of the secure element, a number representing the number of allowed uses for the ticket, and additional information, the method comprising:
  said mobile equipment sending the stored ticket to the said third-party device for checking;
  said third-party device checking the validity of the received ticket;
  said third-party sending a challenge to the said mobile equipment;
  said mobile equipment invoking a read counter in said security element for the counter related to the ticket to be checked by sending the corresponding counter ID and said received challenge;
  said security element generating an authorization token being a signature on authenticator data comprising the said counter ID, current value of the counter, and the public key of the security element;
  said security element sending the generated authorization token to the said mobile equipment;
  said mobile equipment forwarding the received authorization token to the said third-party device; and
  said third-party device verifying the received authorization token by using the key in the received ticket and sending a message to the said mobile device indicating the result of the verification.

* * * * *